United States Patent
Chen et al.

(10) Patent No.: US 8,327,099 B2
(45) Date of Patent: Dec. 4, 2012

(54) METHOD FOR SOFT CONFIGURING A MEMORY DEVICE

(75) Inventors: Pei Tai Chen, Taipei (TW); Shiu Shien Chu, Taipei (TW); Yao Wen Hsu, Taipei (TW)

(73) Assignee: Incomm Technologies Co., Ltd (TW)

( * ) Notice: Subject to any disclaimer, the term of this patent is extended or adjusted under 35 U.S.C. 154(b) by 894 days.

(21) Appl. No.: 12/073,408

(22) Filed: Mar. 5, 2008

(65) Prior Publication Data

US 2008/0209125 A1    Aug. 28, 2008

Related U.S. Application Data

(63) Continuation-in-part of application No. 11/115,157, filed on Apr. 27, 2005, now abandoned.

(51) Int. Cl.
*G06F 12/00* (2006.01)
*G06F 13/00* (2006.01)
(52) U.S. Cl. ......... 711/163; 711/100; 711/154; 711/170
(58) Field of Classification Search .................. 711/100, 711/154, 163, 170
See application file for complete search history.

(56) References Cited

U.S. PATENT DOCUMENTS

| | | | | |
|---|---|---|---|---|
| 6,058,455 A | * | 5/2000 | Islam et al. | 711/114 |
| 7,020,758 B2 | * | 3/2006 | Fisk | 711/172 |
| 7,669,005 B1 | * | 2/2010 | Park et al. | 711/108 |
| 2005/0172085 A1 | * | 8/2005 | Klingman | 711/154 |
| 2005/0216639 A1 | * | 9/2005 | Sparer et al. | 710/305 |

* cited by examiner

*Primary Examiner* — Tuan V. Thai

(57) ABSTRACT

A method for soft configuring communication a memory device to act as a Key Card that can switch on or off some particular functions of either an application program or the memory device itself. The method comprising the steps of: connecting the memory device to an external device; running a specific application program on the external device, the application program writing and storing a specific data into the memory device, the specific data including at least a command and a key; the memory device generating a response value according to the command and key of the specific data; and the external device reading the response value from the memory device and checking a status of the response value; if the response value is checked to be valid, then the application program will be able to access the memory device by using functions defined by the command; if the response value is checked to be invalid, then functions of the application program will be restricted.

5 Claims, 16 Drawing Sheets

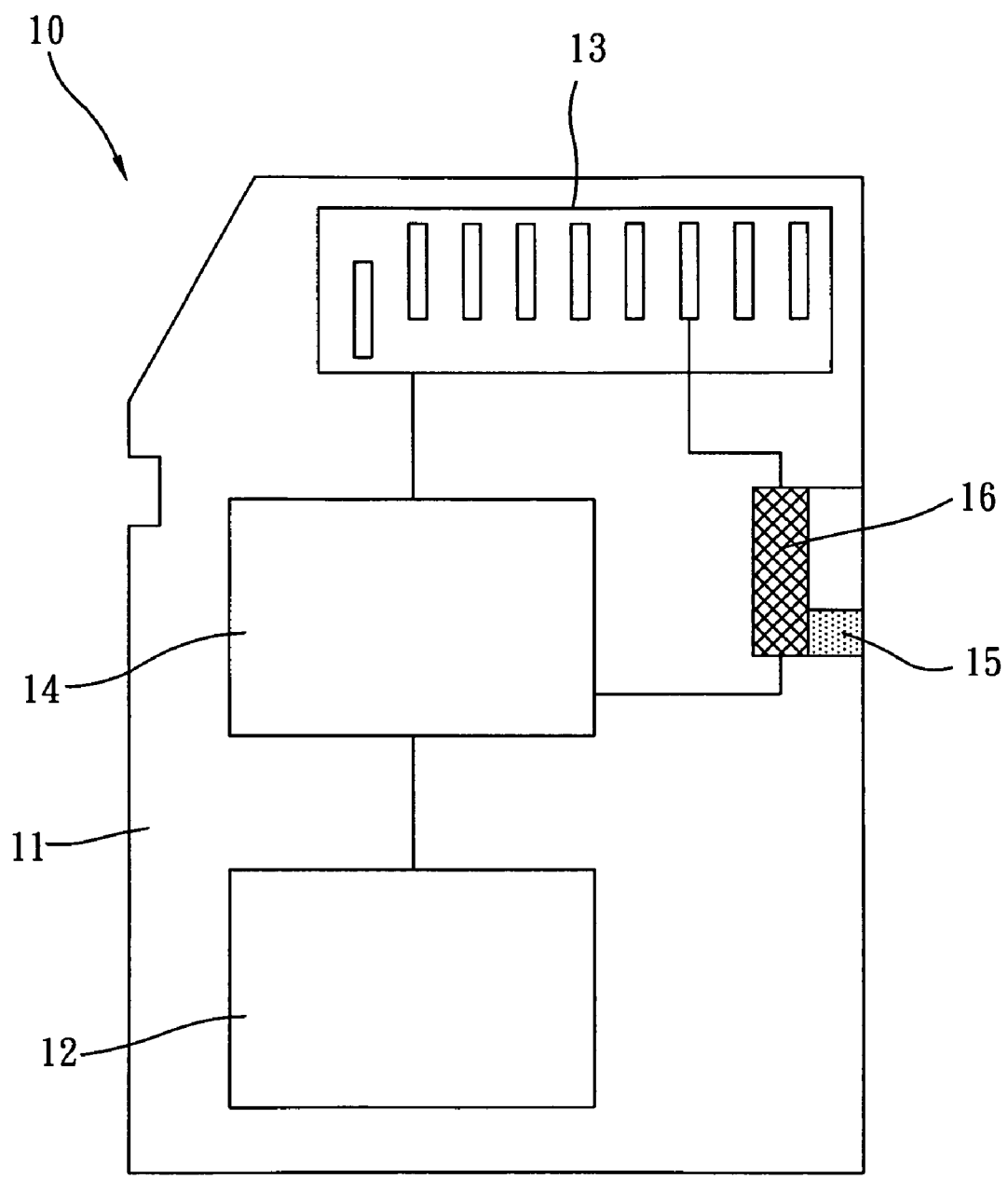
F I G. 1

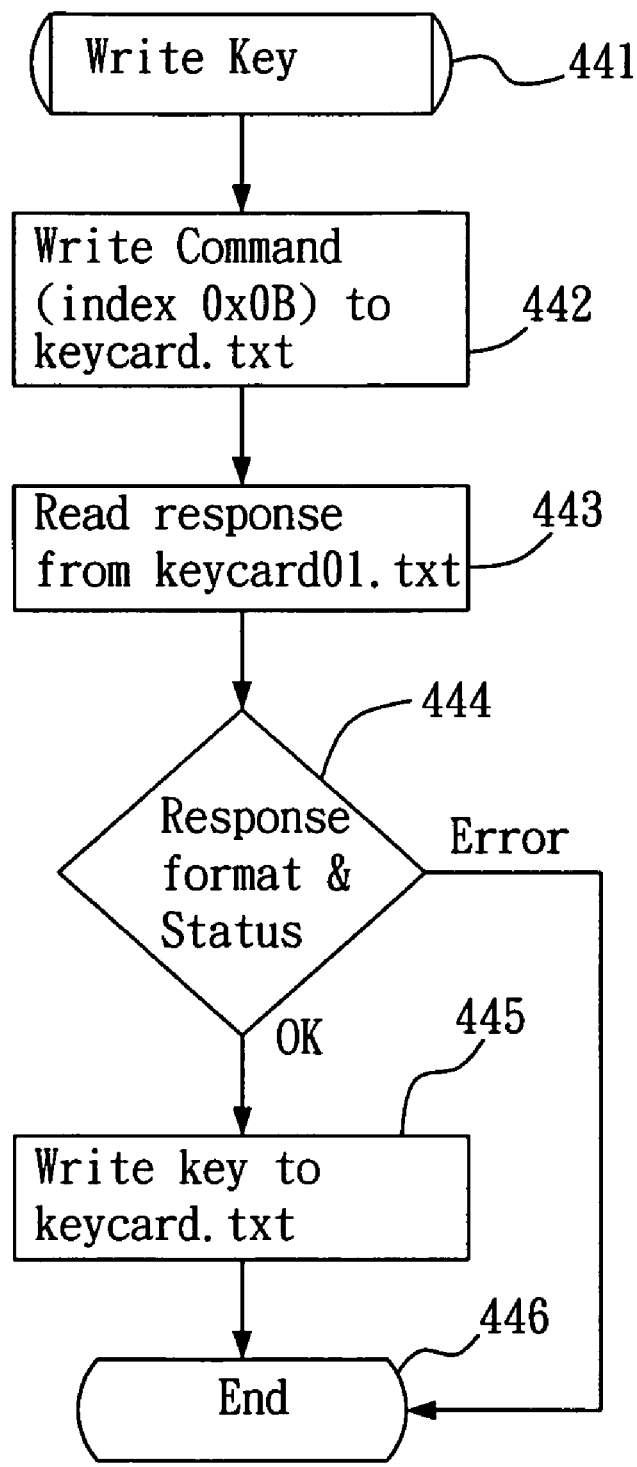
F I G. 16

METHOD FOR SOFT CONFIGURING A MEMORY DEVICE

This application is a continue-in-part (CIP) application of U.S. application Ser. No. 11/115,157 filed on Apr. 27, 2005 now abandoned.

BACKGROUND OF INVENTION

1. Field of the Invention

The present invention is related to a method for soft configuring a memory device, in particular to a method for soft configuring a flash memory card in such a manner that the flash memory card can act as a key card to switch on or off some particular functions of either an application program or the memory device.

2. Description of the Prior Art

Along with the rapid advancement of information technology, demands for information grow explosively. The availability and prevalence of small portable memory devices in recent years, e.g. the flash-memory-based USB flash disk (commonly referred to as "silicon disk drive" or "thumb drive") and memory cards, e.g. CF (compact flash), MS (memory stick), SD Card (Secure Digital card), MMC (MultiMedia card), and xD, and micro hard disk with CF or USB interface, or the external USB or PCMCIA interfaced 2.5-inch hard disk, have more or less satisfied our increasing longing for "information portability".

Currently available portable memory devices ordinarily comprise a non-volatile memory array, a controller, and a transfer interface (I/O Interface). The memory array is used for storing data and must be capable of preserving the stored data without external power supply. Thus memory array typically consists of flash memory or a hard disk. The controller comprises circuits, interfaces and driving mechanism for driving and accessing the memory array. The driving mechanism may be provided as a hardware in the form of a command sequencer circuit for executing a series of micro-code programs, or in the form of a micro-controller/micro-processor circuit disposed in the controller of the portable memory device for executing a series of firmware programs. The transfer interface will determine the protocol by which the portable memory device can link and communicate with an external device.

Among memory cards of different specifications, Secure Digital card (called SD card below) and MultiMedia Card (called MMC card below) have the same profile specifications, except that SD card has an additional write protect button, whereas MMC card does not. Otherwise, the only difference between a SD card and a MMC card is the protocol. Currently SD/MMC combo card reader that can support both SD and MMC protocols to access the data in SD card and MMC card is already available on the market. But so far none of flash memory devices (i.e. flash memory cards) on the market are found to support both SD and MMC dual protocols.

U.S. Pat. Nos. 6,676,420 and 6,567,273 disclosed a kind of single flash memory card with two different sets of connectors and transfer interfaces set thereon for supporting double interface. However, both U.S. Pat. No. 6,676,420 and U.S. Pat. No. 6,567,273 need to use two different sets of connectors to transfer data in different interfaces respectively, which are completely different technology from the present invention.

U.S. Pat. Nos. 6,385,677 and 6,658,516 disclosed a kind of single flash memory card with USB transfer interface set thereon in addition to the card's own interface to achieve the function of supporting double interface. However, the memory cards in those patents does not have USB connector, thereby requiring an external adapter for connecting and using USB interface, which apparently resorts to different technology from the present invention.

SUMMARY OF INVENTION

The main object of the invention is to provide a method for soft configuring a memory device with multiple protocols. The method performs a detecting sequence based on a configure file stored in the memory device, so as to set up a preferred prior order of protocols when the memory device is switched to use one of the protocols corresponding to the supported protocol of the external device.

Another object of the invention is to provide a method for soft configuring a memory device such like a flash memory card that the flash memory card can act as a key card to switch on or off some particular functions of either an application program or the memory device itself.

In a preferred embodiment, the configure file is stored in the user-accessible area of a memory unit of the memory device. Such that users can modify the content of the detecting sequence of the configure file by themselves.

In another preferred embodiment a plurality of detecting sequences are stored in the memory device in advance. Each of the detecting sequences is referred to a predetermined filename of configure file. When users want to use any specific detecting sequence, they don't need to modify the content of the detecting sequence by themselves. They only need to create an empty file with specific filename in the memory device, and then the method of the present invention will automatically uses the detecting sequence referring to that specific filename to perform the preferred prior order of protocols.

In yet another preferred embodiment, the method of the present invention comprises the steps of: connecting the memory device to an external device; running a specific application program on the external device, the application program writing and storing a specific data into the memory device, the specific data including at least a command and a key; the memory device generating a response value according to the command and key of the specific data; and the external device reading the response value from the memory device and checking a status of the response value; if the response value is checked to be valid, then the application program will be able to access the memory device by using functions defined by the command; if the response value is checked to be invalid, then functions of the application program will be restricted.

A further object of the invention is to provide a method for soft configuring communication protocols which can be applied to a memory device with multiple protocols. The memory device comprises a switchable write protect button. The method uses different prior order of protocols according to the switch position of write protect button.

Yet a further object of die invention is to provide a method for soft configuring communication protocols which can be applied to a memory device with multiple protocols. The method disregards a first-time received check signal which is comply with a second communication protocol. The method will switch the memory device to use the second communication protocol for communication with the external device only if more than two times of the check signals complying with second communication protocol are received. That means, the method will take the first communication protocol as the first priority for communication.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

The details of the present invention will be more readily understood from a detailed description of the preferred embodiments taken in conjunction with the following figures.

FIG. 1 is an embodiment of the structural appearance of a flash memory device with a plurality of protocols according to the invention.

FIG. 16 is a flow chart showing how to write the Key into the memory device according to the embodiment of the present invention.

DETAILED DESCRIPTION

The principle of the method for soft configuring communication protocols in accordance with the present invention is to pre-store one or more detecting sequences in a memory device which is capable of communication by using multiple protocols. Each of the detecting sequences is referred to a predetermined filename of configure file. The memory device will actuate the configure file, and set up a preferred prior order of protocols based on the detecting sequence of that configure file when the memory device is switched to use one of the protocols corresponding to the supported protocol of an external device. Users can change their preferred prior order of protocols by either changing a switch position of write protect button formed on the memory device, changing the filename of configure file, or modifying the detecting sequence directly, and thus achieve the function of soft configuring communication protocols.

Figure 2:
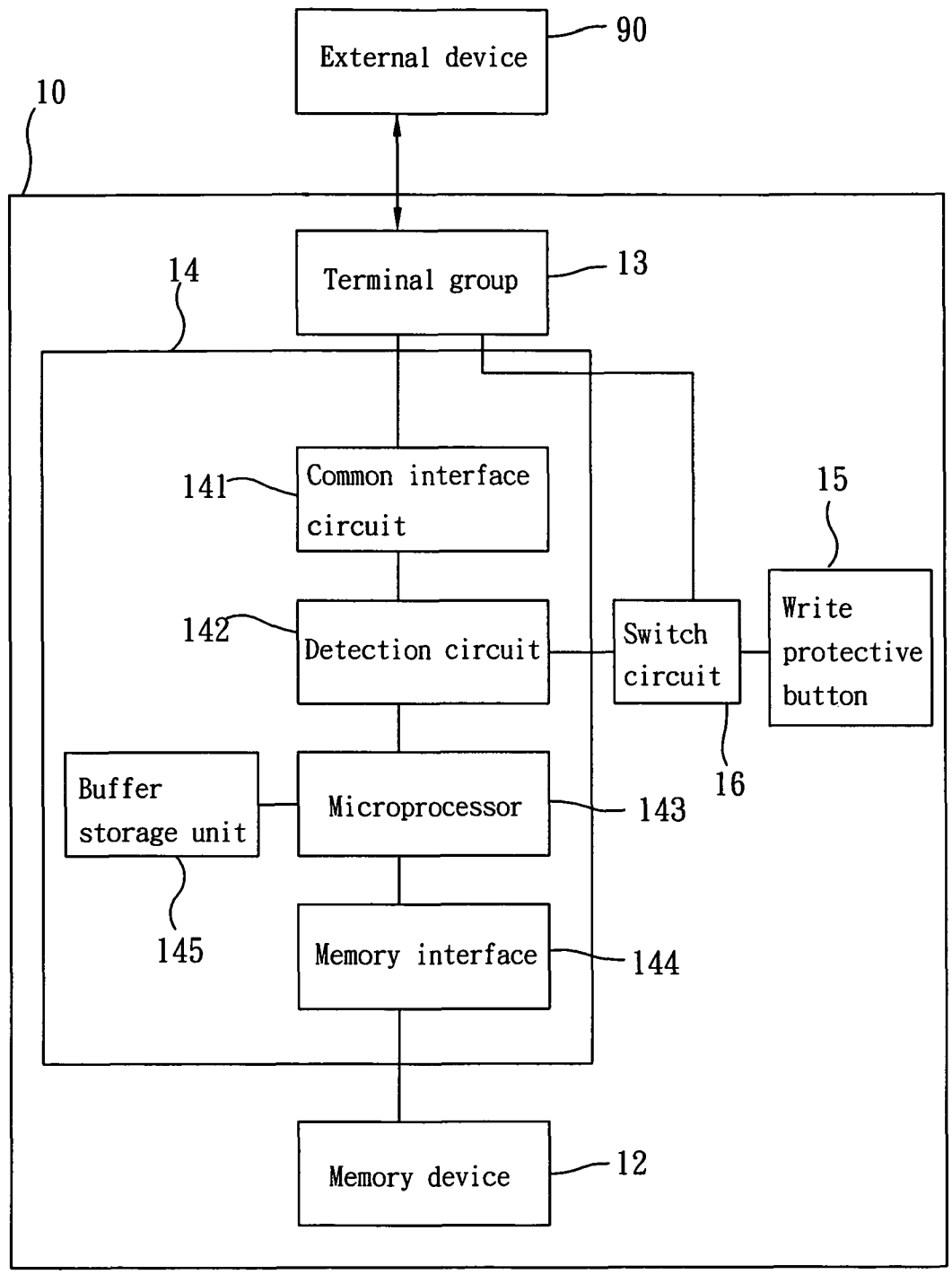
FIG. 2 is a circuit block diagram of a flash memory device with a plurality of protocols according to the invention.

To further illustrate the features, objects and functions of the present invention, detailed descriptions will be provided with reference to the accompanying drawings:

Referring to FIG. 1 and FIG. 2, a first preferred embodiment of a flash memory device 10 with a plurality of protocols according to the invention is shown. FIG. 1 is a structural appearance of a flash memory device 10 with a plurality of protocols according to the invention, wherein the embodiment of the flash memory device 10 with a plurality of protocols according to the invention is a flash memory card complying with the SD specification. FIG. 2 is a circuit block diagram of a flash memory device 10 with a plurality of protocols according to the invention.

As shown in FIG. 1 and FIG. 2, the first embodiment of the flash memory device 10 with a plurality of protocols according to the invention comprises a body 11, a memory unit 12, a terminal group 13, a control unit 14, a write protect button 15, and a switch circuit 16.

The profile size of the body 11 meets the specification of a Secure Digital card (SD) and hence is compatible with the profile specification of a MultiMedia card (MMC). It is also possible to design the body 11 to make it meet the profile specification of a MultiMedia card (MMC) and that, of course, is still compatible with the profile specification of a Secure Digital card (SD).

The memory unit 12 is mounted on the body 11 and consists of a plurality of rewritable non-volatile memory. In this preferred embodiment, the memory unit 12 preferably comprises at lease a flash memory.

The terminal group 13 is furnished on the front side part of the body 11 and is exposed to the outside. The terminal group 13 may be electrically connected to an external device 90 (e.g. a card reader, a digital camera, a personal digital assistant, or a computer which has memory card slots) to transfer the check signal and digital data.

The control unit 14 is mounted on the body 11 and is connected to the memory unit 12 and the terminal group 13. The control unit 14 is used to drive and control the data access within the memory unit 12, and communicate data with the external device 90 via the terminal group 13. In this preferred embodiment, the control unit 14 may exist in the form of a control chip and further comprise a common interface circuit 141, a detection circuit 142, a microprocessor 143, a memory interface 144, and a buffer storage unit 145. The common interface circuit 141 is connected to the terminal group 13 and can transfer data with at least a first protocol and a second protocol. In this preferred embodiment, the common interface circuit 141 is a common interface circuit 141 with Secure Digital card/Multimedia card (SD/MMC) protocol. And, the first protocol is the Secure Digital card (SD) protocol and the second protocol is the MultiMedia card (MMC) protocol. The detection circuit 142 is connected to the common interface circuit 141 and can detect the specification of protocol supported by an external device 90, and can switch the control unit 14 to use one of the first and second protocols (i.e. SD or MMC) to communicate data with the external device 90. The microprocessor 143 is connected between the detection circuit 142 and the memory unit 12, to enable the control unit 14 to use the first and second protocols to transfer data from and/or into the terminal group 13. The memory interface 144 (Flash Interface) is connected between the microprocessor 143 and the memory unit 12, to enable the control unit 14 to store data in the memory unit 12 and read data from the memory unit 12. The buffer storage unit 145 is connected to the microprocessor 143 for temporarily storing data.

The write protect button 15 is furnished on one side of the body 11, which meets the SD specification. The write protect button 15 can be switched between a first position (write protect off) and a second position (write protect on). The switch circuit 16 is connected between the write protect button 15, the control unit 14 and a VSS terminal of the terminal group 13. The switch circuit 16 can transfer the switch position of the write protect button 15 in the form of an electric signal to the control unit 14. The control unit 14 will switch the protocol used for making data communication with the external device 90 according to the electric signal (i.e. the switch position of the write protect button 15). For example, when the write protect button 15 is at the first position (write protect off), the control unit 14 can use the first protocol or the second protocol to make two-way data communication with the external device 90; when the write protect button 15 is at the second position (write protect on), the control unit 14 can use the second protocol to make two-way data communication with the external device 90, but can only use the first protocol to make one-way read-only data transfer.

Therefore, the invention allows a flash memory device to provide at least two different specifications of protocol, and to connect directly electrically to external devices with different protocols via the same set of terminal group to transfer data without requiring any additional adapter.

For a traditional and conventional SD card with single protocol, when the write protect button is switched to the second position (write protect on), the external device can only perform one-way data read-only function on the SD card with single protocol and is unable to write data into the SD card with single protocol. Therefore, the invention in particular makes use of this characteristics, such that when the flash memory device 10 is connected to an external device 90 which supports both SD/MMC protocols and when the user hopes to give priority to the MMC protocol to make two-way data transfer, the user can switch the write protect button to the second position (write protect on) and give priority to the MMC protocol for transferring data when the flash memory device 10 with a plurality of protocols detect that the external device 90 can support MMC protocol. Whereas, if the external device 90 only supports SD protocol, this will enable the one-way data read-only.

For the abovementioned control method for a plurality protocols, it can be executed by the design of a hardware circuit or by software control. In the invention, the preferred embodiment of the control method for a plurality protocols according to the invention is a detecting sequence pre-stored in the memory unit 12. The detecting sequence can control the control unit 14 to use predefined steps for determining whether the first protocol or the second protocol should be used for transferring data.

In a preferred embodiment, the detecting sequence can be stored in the FAT (File Allocation Table) area of the memory unit 12, such that users won't modify, delete or overwrite the detecting sequence in accident. In another preferred embodiment, the detecting sequence can also be saved in a configure file, such as a system file or a command file, and is stored in a user-accessible area of the memory unit 12. Therefore, the user will be able to modify the content of the configure file and write his own detecting sequence to suit his own needs, so as to achieve the function of "soft configuring" communication protocols.

In yet another embodiment, a plurality of detecting sequences are stored in the memory unit 12 in advance. Each of the detecting sequences is referred to a predetermined filename of configure file. In this preferred embodiment, the detecting sequences are not stored in those configure files but are only referring to those filenames. That means, the detecting sequences can be stored in any area (including FAT) of the memory unit 12, while the configure files with predetermined filenames can be empty files or contain only some parameters for the detecting sequences. The parameters contained in the configure file are for adjusting the way that detecting sequence works but not the detecting sequence itself, and thus the size of the configure file can be very short and easy to be created and modified by users. When the flash memory device 10 is connected with an external device 90, the control unit 14 will first check if there is any specific filename in accordance with those predetermined filenames exists in the memory blocks of the memory unit 12. If "YES", then the detecting sequence corresponding to that specific filename will be actuated, so as to set up a preferred prior order of protocols when the memory device 10 is switched to use one of the protocols corresponding to the supported protocol of the external device 90. When users want to use any specific detecting sequence, they don't need to modify the content of the detecting sequence by themselves. They only need to create an empty file with specific filename, and then the method of the present invention will automatically uses the detecting sequence referring to that specific filename to perform the preferred prior order of protocols. For example, when a user wants to use the manufacturer-default detecting sequence for determining the prior order of protocols, the user can delete all configure files with specific filenames in the memory unit 12, or the user can simply create an empty file named "Default.config". Once the control unit 14 finds that there exists the filename "Default.config" or no configure files in the memory unit 12, then the control unit 14 will use a system default detecting sequence (for example, the one shown in FIG. 3) to decide which protocol to use. On the other hand, when the user wants to use the MMC protocol as his first choice for bi-directional communication, and the SD protocol is used only if the external device 90 does not support the MMC protocol at all, then he can simply creates an empty configure file named "MMC-first.config". Moreover, when the user wants to use the SD protocol only and never use the MMC protocol, then he can create the file "SD-only.config". As a result, the user will be able to change the priority of protocols usage without the needs to modify the content of the detecting sequence by themselves.

The following descriptions will illustrate some embodiments of the detecting sequences of the present invention.

Figure 3:
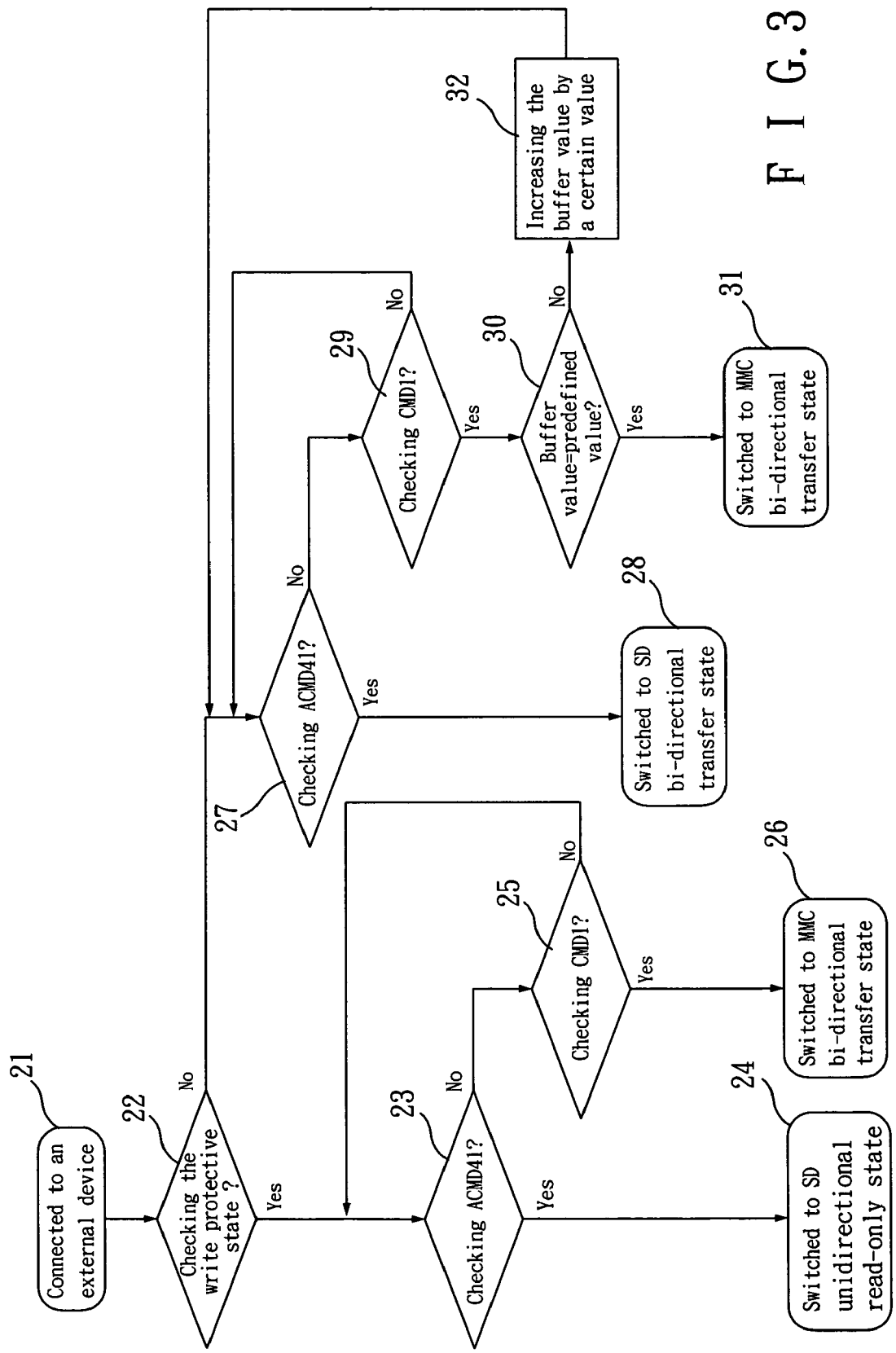
FIG. 3 is a flowchart of an embodiment of the control method for a flash memory device with a plurality protocols according to the invention.

As shown in FIG. 3, a flowchart of a preferred embodiment of the control method, i.e. the detecting sequence, for a plurality protocols according to the invention is shown. The control method for a plurality protocols comprises at least the following steps:

Step 21: connecting the flash memory device 10 to the external device 90, wherein, a buffer value stored in the flash memory device was set to zero when the flash memory device 10 is manufactured in the factory.

Step 22: checking if the switch position of the write protect button 15 is in the write protect on state; when the position of the write protect button 15 is at the first position (i.e. write protect off), the result is "No" and the process will proceed directly to step 27; when the position of the write protect button is at the second position (i.e. write protect on), the result is "Yes" and the process will proceed to step 23.

Step 23: receiving a check signal from an external device and checking if the check signal meets the first protocol signal (i.e. the check signal of the SD protocol, that is a ACMD41 signal), if "Yes", the process will proceed to step 24; if "No", the process will proceed to step 25.

Step 24: using the first protocol (i.e. the SD protocol) to make one-way data read-only transfer; and resetting the buffer value stored in the flash memory device 10 to zero.

Step 25: checking if the check signal meets the second protocol signal (i.e. the check signal of the MMC protocol, that is a CMD1 signal); if "Yes", the process will proceed to step 26; if "No", the process jumps back to step 23.

Step 26: using the second protocol (i.e. the MMC protocol) to make two-way data transfer; and resetting the buffer value stored in the flash memory device 10 to zero.

Step 27: receiving a check signal and detecting if the received check signal meets the first protocol signal (the ACMD41 signal of the SD protocol), if "Yes", the process will proceed to step 28; otherwise, if "No", the process will proceed to step 29.

Step 28: using the first protocol (i.e. the SD protocol) to make two-way data transfer; and resetting the buffer value stored in the flash memory device 10 to zero.

Step 29: detecting if the received check signal meets the second protocol signal (i.e. the CMD1 signal of the MMC protocol), if "Yes", the process will proceed to step 30; if "No", the process jumps back to step 27.

Step 30: checking if the buffer value meets a predefined value; if "Yes", the process will proceed to step 31; if "No", the process will proceed to step 32.

Step 31: using the second protocol (i.e. the MMC protocol) to make two-way data transfer; and resetting the buffer value stored in the flash memory device 10 to zero.

Step 32: storing the predefined value and overwriting the buffer value; if the buffer value equals to the predefined value, the process jumps back to step 27.

Alternatively in another preferred embodiment, the buffer value will be increased or decreased by a certain value and jumps back to step 27 in this step 32. At this time, the predefined value is preferably an integer multiple of the certain value.

The control method of the invention adopts those abovementioned steps as a preferred embodiment due to the higher data transfer rate of current common SD cards available on the market as compared to that of MMC card of version 4.0 or before. Therefore, when the flash memory device 10 with a plurality of protocols according to the present invention is connected to an external device 90 which simultaneously supports both SD/MMC protocols, the user may desire the flash memory device 10 to give priority to the SD protocol with higher transfer rate to transfer data. However, the default value of currently available external devices 90 (e.g. card readers) which simultaneously support SD/MMC protocols is set to give priority to check if a MMC card is connected. Therefore, the control method of the present invention which is specially designed as a detecting sequence consisting of those abovementioned steps can overcome the problem by ignoring the check signal CMD1 of the MMC protocol occurring the first time. That is, if the external device checks the SD protocol first, then the control method of the invention will directly use the SD protocol to make transfer; however, if the external device checks the MMC protocol first, then the control method of the invention may accept the MMC protocol only when the external device does not support the SD protocol and the check signal of the MMC protocol has been consecutively sent out at least twice. Thereby, the control method for a plurality of protocols that gives priority to the SD protocol can be achieved.

In another preferred embodiment, those abovementioned steps, can be easily modified to, for example, increase (or decrease) the buffer value by increment, until it equals to the predefined value. Alternatively, the control method of the invention may accept the MMC protocol only when the external device has consecutively sent out the check signal of the MMC protocol at least three, four, or more times and no check signal of the SD protocol has been sent out. Because those skilled in the art appreciate the slight modifications to those steps and can easily make equivalent modifications after reading the invention, those modifications will not be elaborated here.

However, considering that new specifications of MMC protocol have been developed that provide higher transfer rate than the current SD protocol, and if the user desires to first use the faster MMC protocol, the invention can redefine the priority of protocol by modifying the content of the detecting sequence pre-stored in the memory unit 12. Alternatively, as described previously, the invention specially uses the specific design of a write protect button 15 and a switch circuit 16. After the write protect button 15 has been switched to "on" state, the flash memory device 10 with a plurality of protocols according to the invention will immediately enable the MMC protocol to make two-way data transfer once the external device 90 supporting SD/MMC protocols first checks if a MMC card is connected. That is, the invention can enable the flash memory device 10 with a plurality of protocols connected to an external device 90 which supports SD/MMC protocols to first use the MMC protocol by switching the write protect button 15 to "on" state. However, it will first attempt to adopt the SD protocol to transfer data when the write protect button 15 is in "off" state.

That is, regardless the flash memory device 10 with a plurality of protocols according to the invention is connected to a commercially available external device which only supports single SD protocol or single MMC protocol, the invention always can smoothly switch to the same protocol to transfer data. And when the flash memory device 10 with a plurality of protocols according to the invention is connected to an external device which supports both SD/MMC protocols, then the invention will, first detect the state of the write protect button 15. When the write protect button 15 is in "on" state and the external device which supports SD/MMC protocols first checks the CMD1 signal of the MMC protocol, the flash memory device 10 according to the invention will immediately use the MMC protocol to transfer data, thereby achieving the function of first attempting to use the MMC protocol. When the write protect button 15 is in "off" state and the external device which supports SD/MMC protocols first checks the CMD1 signal of the MMC protocol, the flash memory device 10 according to the invention will still ignore the first transferred CMD1 signal. Hence, the external device which supports SD/MMC protocols will mistakenly construe that the flash memory device 10 according to the invention does not support the MMC protocol, and sends out a ACMD41 signal of the SD protocol to cause the flash memory device 10 to adopt the SD protocol for data transfer. Thus the function of first attempting to use the SD protocol for transferring data can be achieved.

In other embodiments described hereinafter, most elements or steps are similar to those of the abovementioned embodiment. Thus the same or similar elements or steps are directly given the same reference name and numeral and will not be described in detail.

Figure 4:
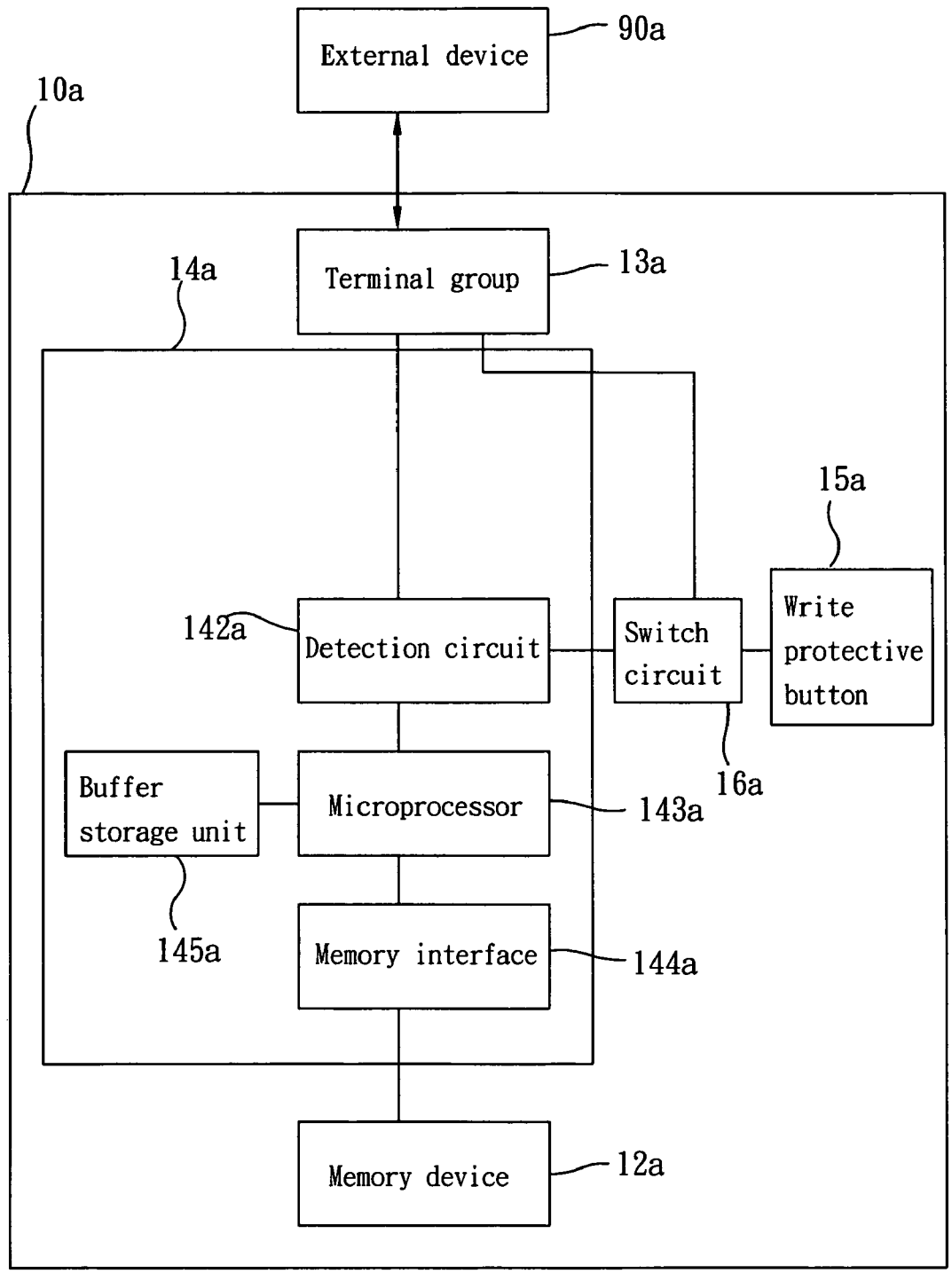
FIG. 4 is a circuit block diagram of a flash memory device with a plurality of protocols in the second embodiment of flash memory device according to the invention.

Referring to FIG. 4, the circuit block diagram of the flash memory device 10a with a plurality of protocols in the second embodiment of the invention is shown. The flash memory device 10a shown in FIG. 4 is almost the same as the embodiment shown in FIG. 2 and also comprises a body 11a, a memory unit 12a, a terminal group 13a, a control unit 14a, a write protect button 15a, and a switch circuit 16a. The flash memory device 10a is also connectable to an external device 90a. Similarly, the control unit 14a also comprises a detection circuit 142a, a microprocessor 143a, a memory interface 144a, and a buffer storage unit 145a. The only difference is that, the control unit 14a of the flash memory device 10a shown in FIG. 4 is not furnished with a common interface circuit, but is directly coupling the terminal group 13a to appropriate contacts of the detection circuit 142a by conductive wires.

Figure 5:
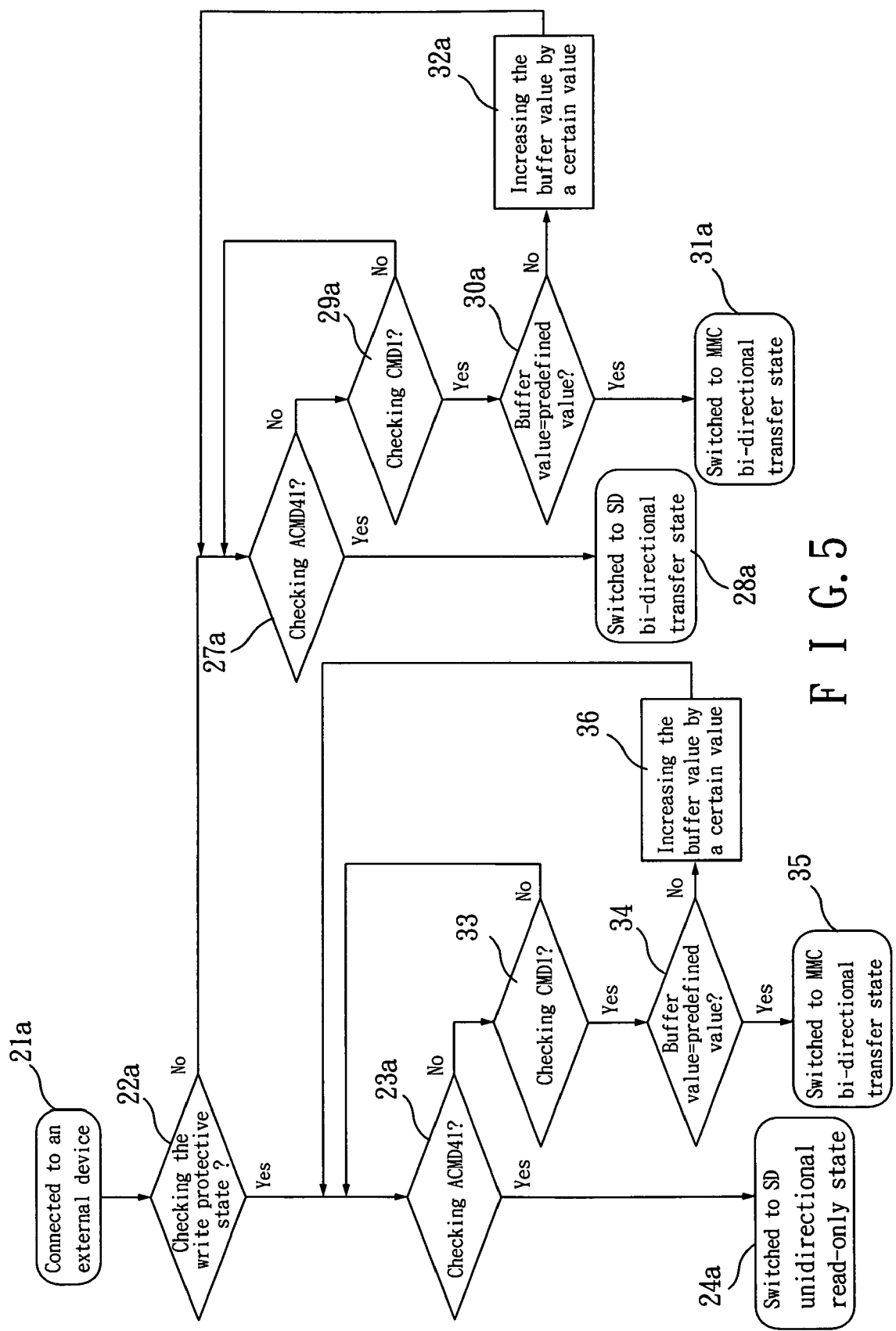
FIG. 5 is a flowchart of the control method (the detection procedure) in the second embodiment of flash memory device having a plurality protocols according to the invention.

Referring to FIG. 5, a flowchart of a second preferred embodiment of the control method, i.e. the detecting sequence for a plurality protocols according to the invention is shown. Steps 21a-24a and 27a-32a of the control method shown in FIG. 5 respectively correspond (or similar) to steps 21-24 and 27-32 of the flowchart shown in FIG. 3, which will not be described hereinafter. The difference of the control method shown in FIG. 5 lies in that when the result for checking the switch position of the write protect button in step 22a is "Yes" at the second position (i.e. write protect on) and the check signal does not (i.e., "No") meet the first protocol signal (ACMD 41 signal) in step 23a, then the process will proceed to step 33. The flow process is described as follows.

Step 33: detecting if the received check signal meets the second protocol signal (the CMD1 signal of the MMC protocol); if "Yes", the process will proceed to step 34; if "No", the process jumps back to step 23a.

Step 34: checking if the buffer value meets a predefined value; if "Yes", the process will proceed to step 35; if "No", the process will proceed to step 36.

Step 35: using the second protocol (i.e. the MMC protocol) to make two-way data transfer; and resetting the buffer value stored in the flash memory device 10 to zero.

Step 36: increasing the predefined value by a certain value and jumping back to step 23a, wherein the predefined value is an integer (2, 3, or 4 etc.) multiple of the certain value.

With the detection procedure, when the write protect button is "Yes" at the second position (i.e. write protect off), the flash memory device according to the invention will still ignore the first CMD1 signal(s) of the MMC, and give priority to using the first protocol (SD).

Figure 6:
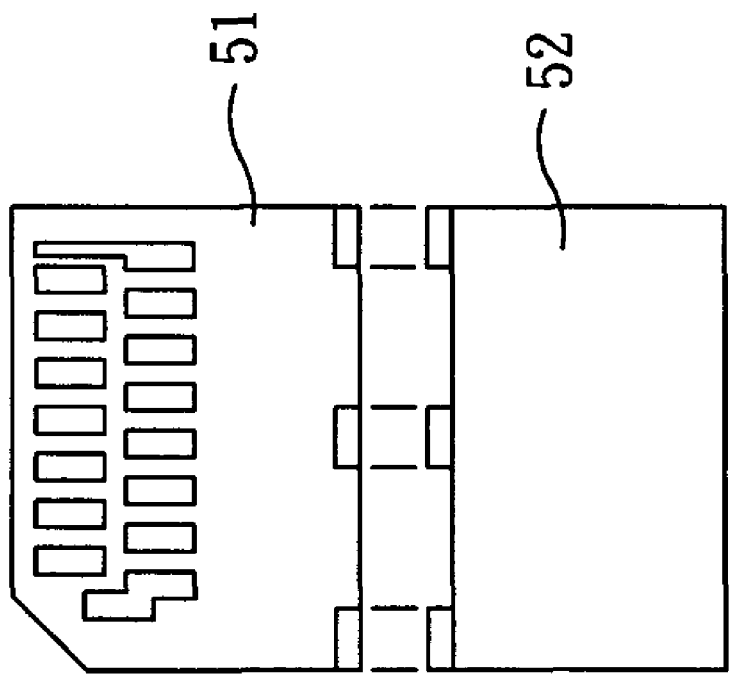
FIG. 6 is an appearance of a reduced MultiMedia card (RS MMC).

Referring to FIG. 6, the appearance of a reduced MultiMedia card 51 (called RS MMC for short below) is shown. The size of the body of the reduced MultiMedia card 51 is approximately equal to the size of the fore half part of a commonly traditional MMC body. The reduced MultiMedia card 51 has 13 pins and is still compatible with the terminal group of the traditional MMC. When the connection of the reduced MultiMedia card 51 to a traditional MMC card reader is desired, its size specification will be completely the same as a traditional MMC by attaching a second half part 52 of the body. Therefore, the flash memory device with a plurality of protocols according to the invention as well as the control chip and the control method thereof may similarly apply to the reduced MultiMedia card 51.

Figure 7:
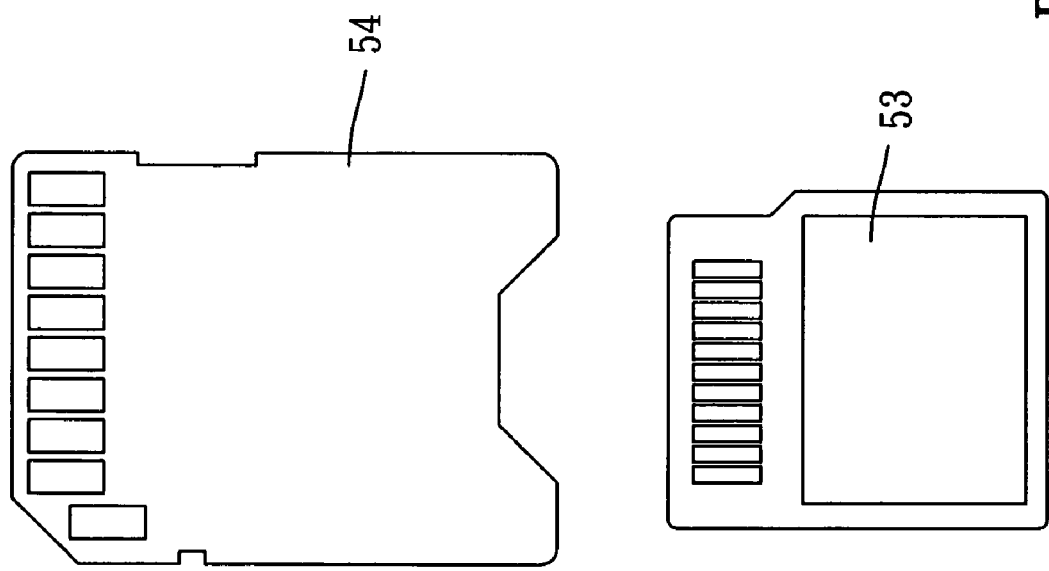
FIG. 7 is an appearance of a mini Secure Digital card (mini SD).

Referring to FIG. 7, the appearance of a mini Secure Digital card 53 (mini SD) is shown. The size of the body of the mini Secure Digital card 53 is smaller than the size of a commonly traditional SD body, and the mini Secure Digital card 53 is unable to be directly connected to a traditionally common SD card reader. However, the protocol of the mini Secure Digital card 53 is backward compatible with the protocol of a traditionally common SD. Therefore, after inserting the mini Secure Digital card 53 into an adapter 54, it will have the same specification of size as a traditional SD, and data can be read out by a traditionally common SD card reader. Therefore, the flash memory device with a plurality of protocols according to the invention as well as the control chip and the control method thereof may similarly apply to the mini Secure Digital card 53.

It is noted that, although the above illustrated embodiments are referring to a flash memory device 10 complying with both SD and MMC specifications which are in the same size and contour. However, the "soft configuring" method of the present invention can be used on any kind of memory device which supports two or more protocols. Those memory devices which support two or more protocols but need additional connector or adaptor for coupling the external device, for example a CF/USB dual-interface memory card, can also apply the "soft configuring" method of the present invention to determine the priority of protocols.

Figure 8:
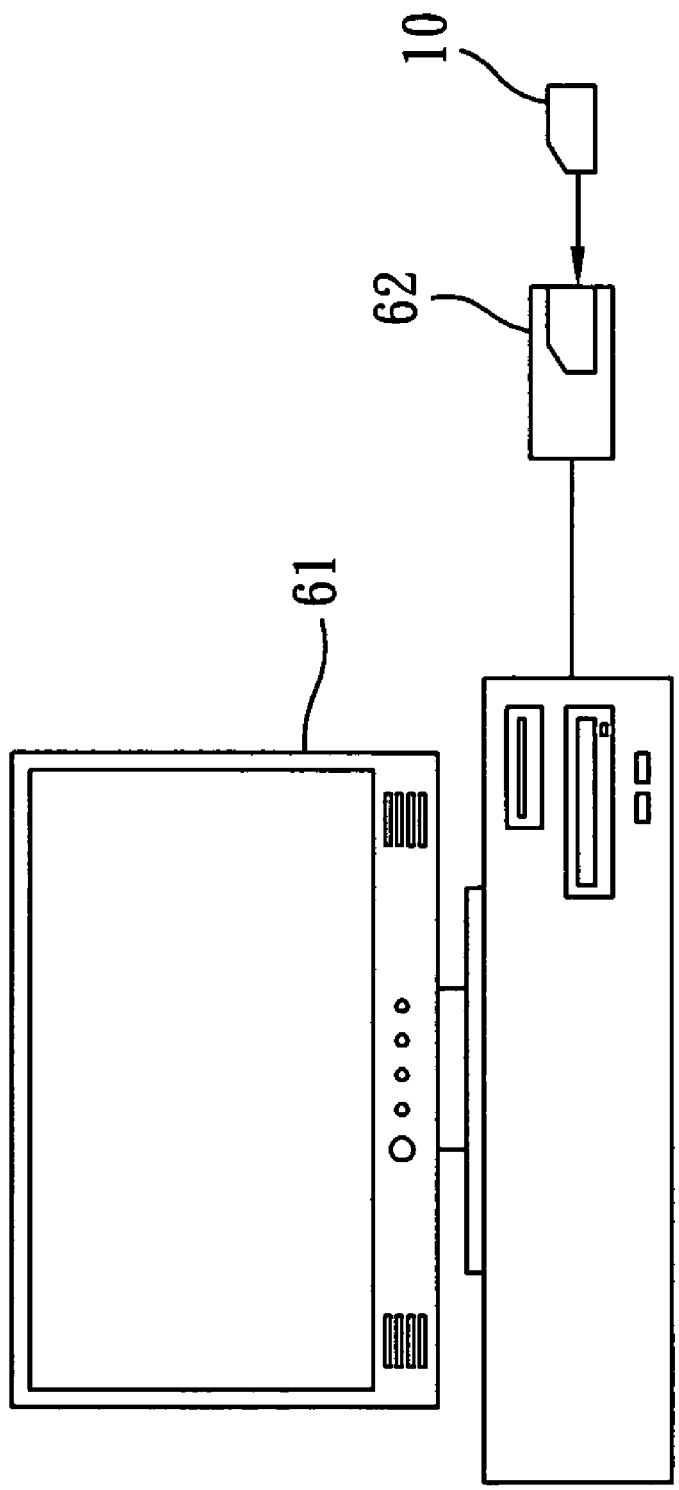
FIG. 8 is a schematic diagram showing the memory device of the present invention being inserted into a card reader which is connected to a computer.
Figure 9:
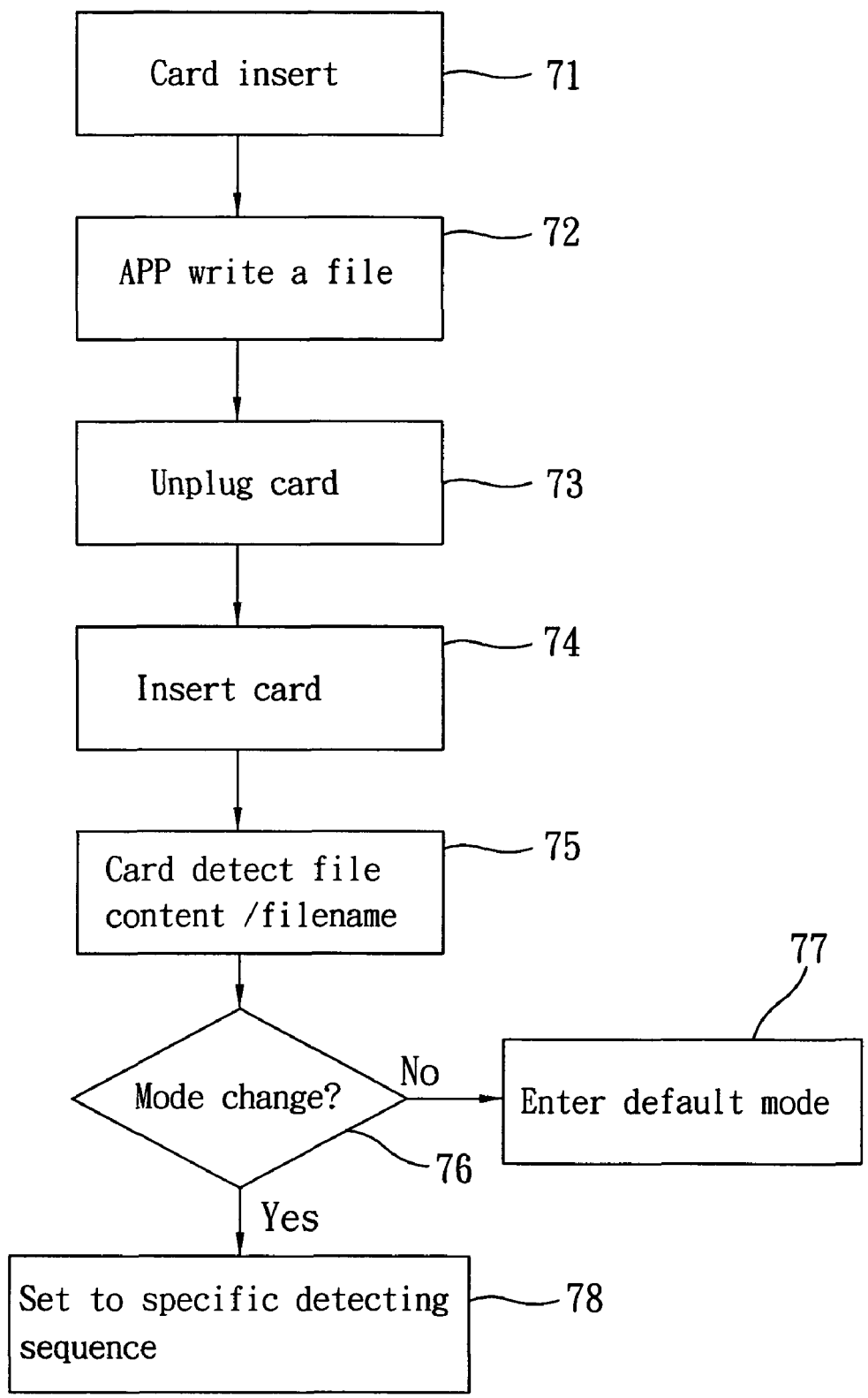
FIG. 9 is a flowchart showing a preferred embodiment according to how the detecting sequence can be soft configured by the user.

Please refer to FIG. 8 and FIG. 9, which illustrate a preferred embodiment for the users to soft configure the communication protocols of the memory device 10 of the present invention. Wherein, FIG. 8 shows the memory device 10 of the present invention is to be inserted into a card reader 62 which is connected to a computer 61. FIG. 9 illustrates a flowchart showing a preferred embodiment according to how the detecting sequence can be soft configured by the user.

As shown in FIG. 8, the memory device 10 is a multi-protocol memory card which is capable of communication by using at least a first protocol and a second protocol. The memory device 10 can be inserted into a card reader 62 which is connected to a computer 61, such that the computer 61 can read/write data from/into the memory device 10 through the card reader 62. Although the card reader 62 shown in FIG. 8 is an external card reader, however, it is obvious for anyone skilled in the art that the card reader 62 can also be built-in the computer 61. By running a specific application program on the computer 61, some specific commands (or files) can be written into some specific locations (or with some specific filenames) of the memory, device 10 to change the detecting mode of protocols (e.g., to change the detecting sequence), so as to achieve the object of soft configuring multiple protocols.

Please refer to FIG. 9, the communication protocols of the memory device 10 can be soft configured by the following steps:

Step 71: Card insert. Inserting the memory device 10 into the card reader 62.

Step 72: Application writes a file. Running a specific application program on the computer 61. The application program will write and save a file into a user-accessible area of the memory device 10. In one preferred embodiment, the file written by the application program contains the detecting sequence which will set up a preferred prior order of protocols when the memory device 10 is switched to use one of the protocols corresponding to the supported protocol of the external device (e.g., card reader 62). In another preferred embodiment, the file written by the application program is only an empty file or a small file contains some parameters only. The empty file (or small file) has a predefined specific filename. In addition, the memory device 10 is pre-stored with a plurality of detecting sequences each is referred to a specific filename. Therefore, the file having the specific filename written by the application program is actually referring to one of the detecting sequences pre-stored in the memory device 10. And, the parameters (if exist) of the file are used to influence the way of that referred detecting sequence works.

Step 73: Unplug card. After the file is created and stored into the memory device 10, the memory device 10 is removed from the card reader 62.

Step 74: Insert card. Inserting the memory device 10 into the card reader 62 again, such that the computer is once again connected with the memory device 10.

Step 75: Card detect file content/filename. The memory device 10 detects the content of the file to obtain the detecting sequence itself, or to choose one detecting sequence from its pre-stored detecting sequences based on the filename of that file. The detecting sequence decided in this step will be used to set up a preferred prior order of protocols when the memory device 10 is switched to use one of the protocols corresponding to the supported protocol of the external device (e.g., card reader 62).

Step 76: Mode change? To see whether the detecting mode has been changed by Step 75; if "No", then perform Step 77; if "Yes", then proceed Step 78.

Step 77: Enter default mode. Using default detecting sequence to set up the preferred prior order of protocols.

Step 78: Set to specific detecting sequence. Using the new detecting sequence to set up the preferred prior order of protocols.

Figure 10:
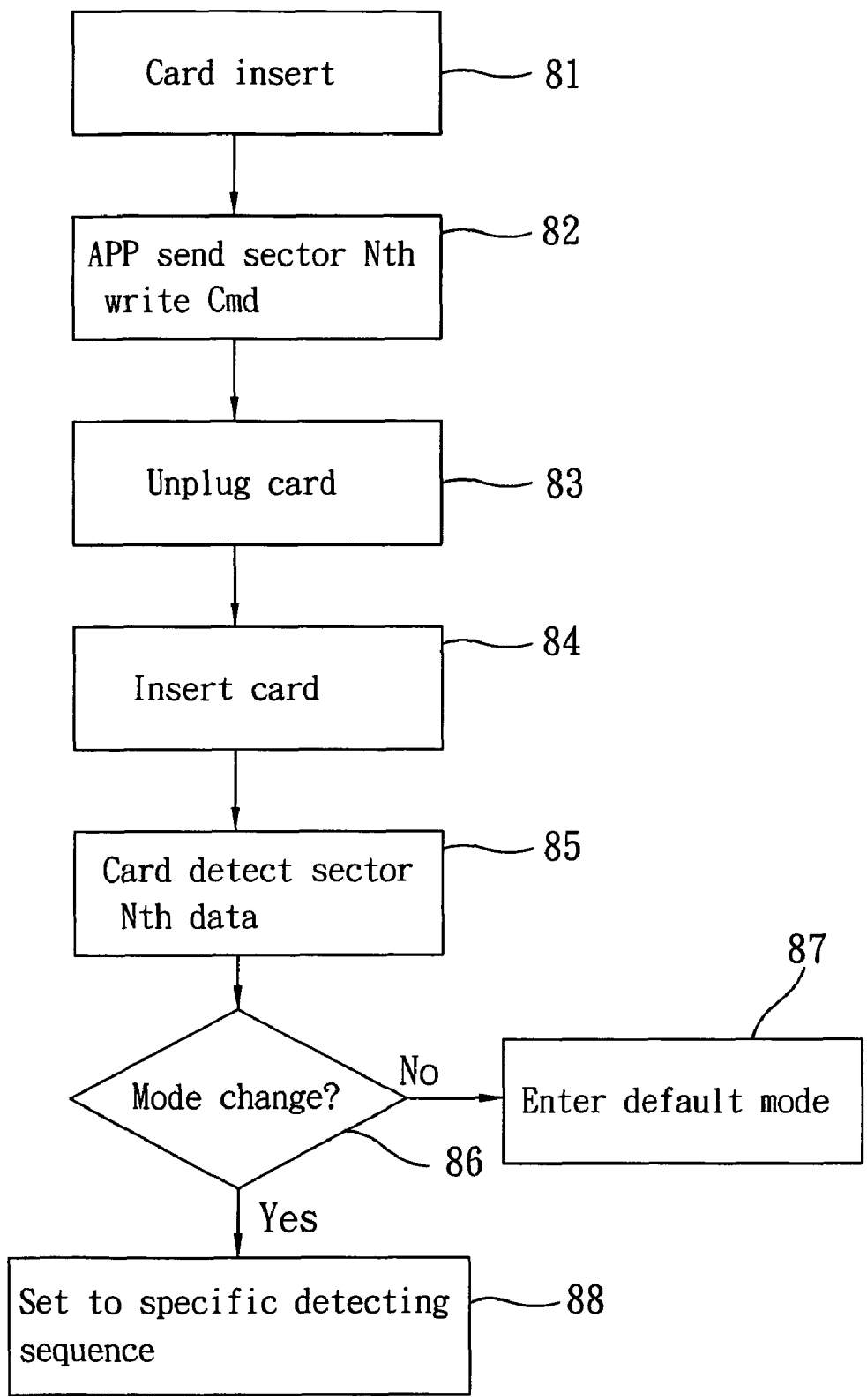
FIG. 10 is a flowchart showing another preferred embodiment according to how the detecting sequence can be soft configured by the user.

Please refer to FIG. 10, which illustrates a flowchart showing another preferred embodiment according to how the detecting sequence can be soft configured by the user. As shown in FIG. 10, the communication protocols of the memory device 10 can also be soft configured by the following steps:

Step 81: Card insert. Inserting the memory device 10 into the card reader 62.

Figure 11:
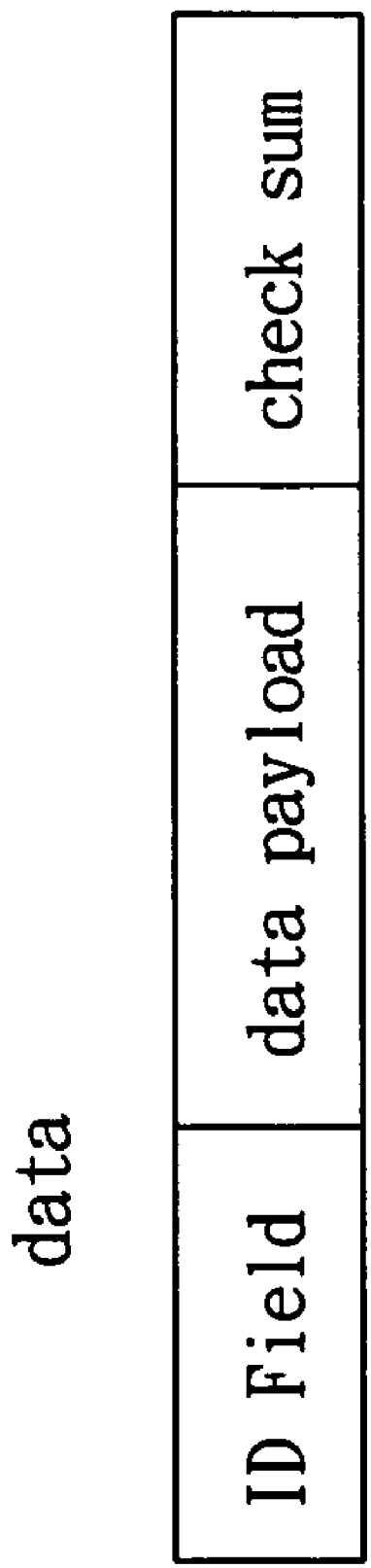
FIG. 11 is a schematic diagram illustrating an embodiment of the specific data stream which is to be written into the file system area of the memory device in accordance with the present invention.

Step 82: Application send sector Nth write command. Running a specific application program on the computer 61. The application program will write one or more specific data streams into one or more predetermined specific locations (such as the Nth sector) of the memory device 10. In this preferred embodiment, the predetermined specific location can be in the FAT (File Allocation Table) or MBR (Master Boot Record, which is located at the $0^{th}$ sector) of memory device 10, such that it won't be easily erased by daily operation of the memory device 10. Please refer to FIG. 11, which illustrates an embodiment of the specific data stream which is to be written into the file system area (e.g., FAT or MBR area) of the memory device 10. The specific data stream of the present invention is typically in a length of one sector or several sectors and comprises an ID field, a data payload, and a checksum. The ID field represents the address of the specific data stream, for example, the Nth sector. The data payload contains some specific parameters which are used to influence the function of the detecting sequence (or detecting sequences) pre-stored inside the memory device 10. The value of the checksum is for the file system to recognize its contents. The present invention defines a specific checksum value for the specific data stream, which is different from the checksums of normal file system. Such that, not only the specific data stream of the present invention can be recognized by simply checking the value of the checksum, but also its corresponding detection sequence will be error proof from normal sector writing requests.

Step 83: Unplug card. After the specific data stream is written into the memory device 10, the memory device 10 is removed from the card reader 62.

Step 84: Insert card. Inserting the memory device 10 into the card reader 62 again, such that the computer is once again connected with the memory device 10.

Step 85: Card detect sector Nth data. The memory device 10 detects the data of the sector Nth to obtain the parameters. These parameters are used to change the operating mode of the detecting sequence (or detecting sequences) pre-stored in the memory device 10.

Step 86: Mode change? To see whether the detecting mode has been changed by Step 85; if "No", then perform Step 87; if "Yes", then proceed Step 88.

Step 87: Enter default mode. Using default detecting sequence to set up the preferred prior order of protocols.

Step 88: Set to specific detecting sequence. Using the new detecting sequence to set up the preferred prior order of protocols.

The following descriptions and accompanying figures disclose a method for soft configuring a memory device according to yet another preferred embodiment of the present invention. The memory device can act as a Key Card to switch on or off some particular functions of either an application program or the memory device itself. The memory device can be a flash memory device 10 alike the one illustrated in FIG. 2 and also comprises a body 11, a memory unit 12, a terminal group 13, a control unit 14, a write protect button 15, and a switch circuit 16. Because all these elements 11-16 contained in the flash memory device 10 has been illustrated in detail previously, no more description will be provided hereunder.

Figure 12:
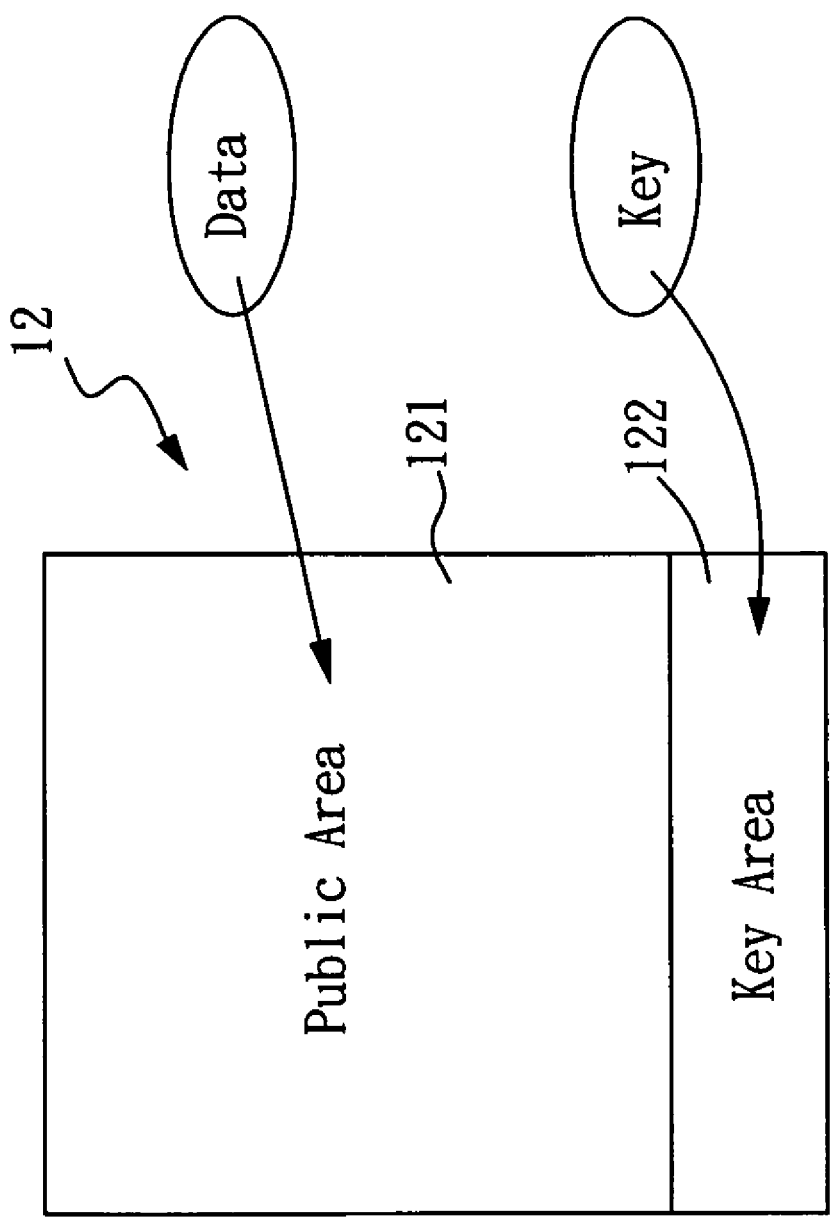
FIG. 12 is a schematic diagram illustrating the areas of memory unit of the memory device in accordance with an embodiment of the present invention.

Please Refer to FIG. 12, in this preferred embodiment, the memory unit 12 is divided into two sections, one is a public area 121 and the other one is a key area 122. The public area 121 is an area accessible by users and other application programs to read and write data. The key area 122 is for application programs to read and put keys and/or authority strings. This key area 122 usually is located at an area that is accessible by some typical application programs only, for example but not limited to: the FAT table of the memory unit. By determinations of the keys and/or authority strings stored in the key area 122, the public area 121 can be set to disable READ or WRITE functions, or to switch on or off some other particular functions. For example, if the READ function is disabled by means of the keys and/or authority strings, then only the filenames of the data files contained in the public area 121 can be read by the application programs, but the content of those files cannot be read. In addition, if the WRITE function is disabled by means of the keys and/or authority strings, then no data can be written to the memory unit 12. The keys and/or authority strings can be modified and saved to particular locations of the key area 122 by means of predetermined commands and application programs, so as to achieve the objective to use the memory device to act as a key card to switch on or off some specific functions of either the application program or the memory device.

An example to handle the keys and/or authority strings is to provide specific files to act as a command window. In this preferred embodiment, these files include a filename "keycard.txt" which is for accepting commands coming from the application program, and another filename "keycard01.txt" which is generated by the memory device itself according to the content of accepted commands stored in "keycard.txt". This file "keycard01.txt" will then be read by the application program in order to decide what functions should be switched on or off. Once the memory device of the present invention is connected to an external device 90 as illustrated in FIG. 2, the application program executed in the external device must write the file "keycard.txt" (also referred as the written file hereinafter) into the key area 122 of memory unit 12 of the memory device. If no "keycard.txt" is written or the content of "keycard.txt" is invalid upon initiating process of the memory device, then the response file "keycard01.txt" will contain either a failure key or a restricted key. As a result, the application program executed in the external device will be unable to access the data stored in the public area 121 of memory unit 12 of the memory device, or can only read the filenames of the data but not contents of them. An example for achieving such features is to employ a cipher key to scramble the data stored in the public area 121. This cipher key can either act as a key to encode and decode the data, or a key to scramble the file-allocation-tables of these data, such that the data will be accessible by the application program only when a correct cipher key is provided. The file "keycard.txt" can either contain such cipher key directly, or contain an authority string which can be used to trigger a corresponding cipher key per-stored in the key area 122 of memory device. In addition to either the cipher key or authority string, a typical example of the file "keycard.txt" also contains some tokens and commands. If the file "keycard.txt" written to the memory device is valid, then the response file "keycard01.txt" will be generated according to the tokens and commands contained in the "keycard.txt", and then this file "keycard01.txt" must be read by the application program of the external device. The application program will require the file "keycard01.txt" in order to allow the application program to perform specific functions based on the response values contained in the file "keycard01.txt". In this embodiment, both the files "keycard.txt" and "keycard01.txt" contain 512 bytes of data, and examples of the formats of these two files are shown in Table 1 and Table 2 respectively.

TABLE 1

Command format of file "keycard.txt"

| Address | Value |
|---|---|
| 0 | Token |
| 1 | Token |
| 2 | Index + Token |
| 3 | CMD[2] |
| 4 | Response File |
| 5 | Protect Flag (only for Index 0x0C and 0x0D) |
| 6 | CMD[3] |
| 7 | Key Index(0~31) |
| 8~15 | Reserve |
| 16~255 | Authentication Token (Reserved) |
| 256~265 | Authority String (i.e."XXXX") |
| 266~511 | Dummy Data |

Wherein, the application program of external device should write 512 Byte Data, which named CMD[512] as command, to the memory unit of memory device.
Token=(CMD[11]+CMD[22]+CMD[33]);
wherein, CMD[11], CMD[22] and CMD[33] can be changed to other locations.

If no "keycard.txt" is written or the Authority String is incorrect, then the memory device of the present invention will response "Authority String Error" error by means of the file "keycard01.txt".

TABLE 1

Command format of file "keycard.txt"

| Address | Value |
|---|---|
| 0 | Token |
| 1 | Token |
| 2 | Token |
| 3 | 0 + Token: OK |
|   | 1 + Token: Fail |

TABLE 1-continued

Command format of file "keycard.txt"

| Address | Value |
|---|---|
|   | 2 + Token: CMD check fail |
|   | 3 + Token: Undefined CMD |
|   | 4 + Token: Authority String Error |
|   | 5 + Token: Repeat Token Error |
|   | 6 + Token: Key Index Error |
|   | 7 + Token: Duplicated Card Error |
| 4 | 0 + Token: Public Area |
|   | 1 + Token: Security Area |
| 5 | 0 bit: Public Area Write Flag |
|   | 1 bit: Public Area Read Flag (+Token) |
| 8 | Version + Token |
| 16~240 | Dummy Data |
| 240~255 | CID |
| 256~511 | Dummy Data |

Wherein, after getting commands from the application program of external device, then the memory device of the present invention will respond 512 Byte data to the application program. Because the memory device is a passive device, so the application program must read the file "keycardXX.txt (keycard01.txt for example)" to get response values. That is, when establishing connections between the memory device and the external device, the application program of external device must firstly send commands (i.e. write file) and then to read the responses (i.e. read file).

Please also refer to Table 3 which illustrates examples of the commands.

TABLE 3

Command Index

| Value | Description |
|---|---|
| 0x00 | Reset Key Card |
| 0x01 | Enter Security Area (Not support in this version) |
| 0x02 | Enter Public Area |
| 0x03 | Get Area Status (It always return 0 for public area) |
| 0x05 | Read CID |
| 0x06~0x07 | Reserve |
| 0x08 | Read Key |
| 0x09 | Read Public Area Status(Flag) |
| 0x0A | Read Key Card Version |
| 0x0B | Write Key |
| 0x0C | Set Temp Write Protect Flag (After Power on, restore to original setting) 0x00: Temp Write Protect Enable 0xFF: Temp Write Protect Disable |
| 0x0D | Set Temp Read Protect Flag (After Power on, restore to original setting) 0x00: Temp Read Protect Enable 0xFF: Temp Read Protect Disable |
| 0x0E | Set Write Protect Flag (Public Area) 0x00: Write Protect Enable 0xFF: Write Protect Disable |
| 0x0F | Set Read Protect Flag (Public Area) 0x00: Read Protect Enable 0xFF: Read Protect Disable |

Please note that, the above tables are merely examples of the present invention. Various modifications may apply to the formats of commands and files illustrated above.

Figure 13:
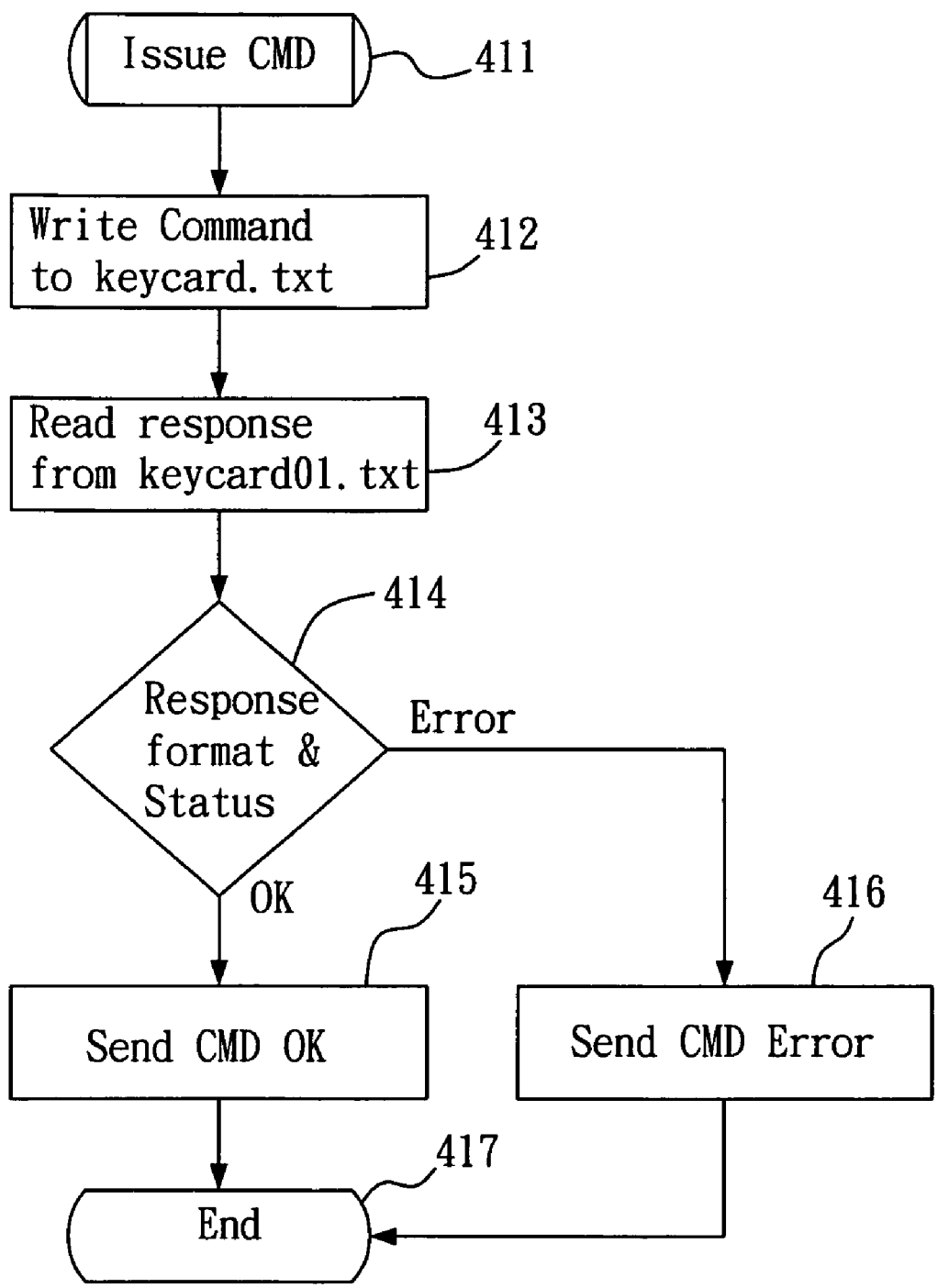
FIG. 13 is a flow chart showing how to issue commands to the memory device according to an embodiment of the present invention.

Please refer to FIG. 13, which illustrates a flow chart about how to issue commands to the memory device according to an embodiment of the present invention.

Step 411: Starting the process to issue commands (CMD).

Step 412: The application program executed in the external device writes commands to the file "keycard.txt" of the memory device.

Step 413: The application program reads responses from the file "keycard01.txt" of the memory device.

Step 414: The application program checks the content of file "keycard01.txt" to see if the response format and status thereof are valid.

If the result of check performed in Step 414 is "OK", then proceeds Step 415 to send CMD OK and then proceeds Step 417; if the result of check performed in Step 414 is "Error", then proceeds Step 416 to send CMD Error and then proceeds Step 417.

Step 417: End process.

Figure 14:
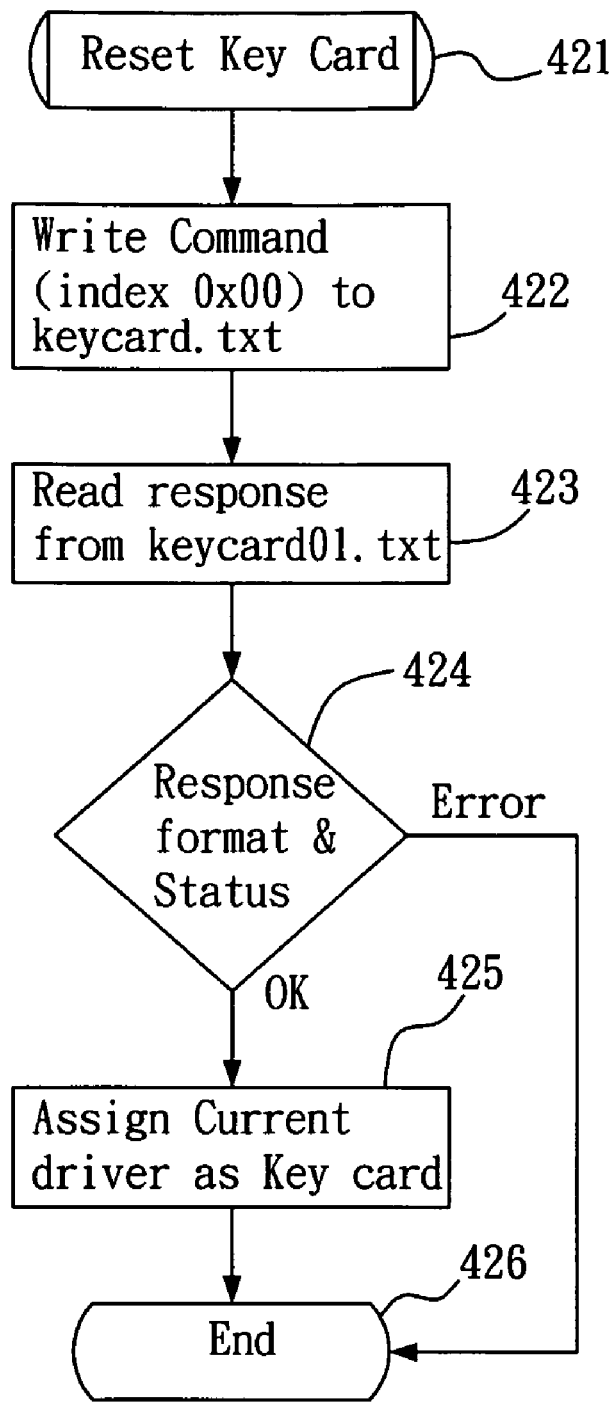
FIG. 14 is a flow chart showing how to initialize the memory device according to the embodiment of the present invention.

Please refer to FIG. 14, which illustrates a flow chart about how to initialize the memory device according to the embodiment of the present invention. In order to use the "Key Card" features of the memory device, the memory device has to be reset by using command 0x00 first. After receiving the response values in which the address[0]~address[2] are checked OK, then this response format is valid, and then the status in the address[3] is accepted. The initialization process of the memory device comprises the following steps:

Step 421: Starting the process to Reset Key Card (i.e. reset the memory device of the present invention).

Step 422: The application program executed in the external device writes command (index 0x00) to the file "keycard.txt" of the memory device.

Step 423: The application program reads responses from the file "keycard01.txt" of the memory device.

Step 424: The application program checks the content of file "keycard01.txt" to see if the response format and status thereof are valid.

If the result of check performed in Step 424 is "OK", then proceeds Step 425 to assign current driver as Key Card and then proceeds Step 426; if the result of check performed in Step 424 is "Error", then proceeds Step 426 directly.

Step 426: End process.

Figure 15:
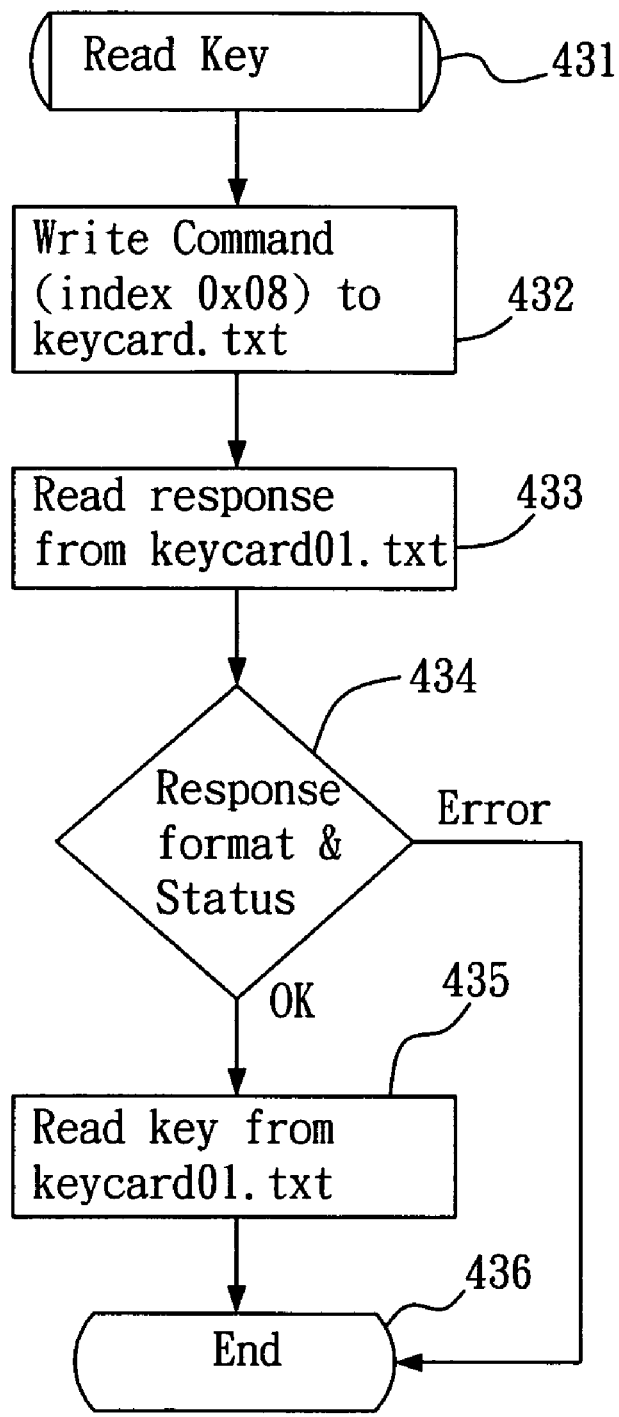
FIG. 15 is a flow chart showing how to read the Key from the memory device according to the embodiment of the present invention.

Please refer to FIG. 15, which illustrates a flow chart about how to read the Key from the memory device according to the embodiment of the present invention. After initialized the memory device, the key can be read from the memory device at any time. If no key is inside the memory device, then the 0xFF value will be acquired. In order to read key, the read key CMD with index 0x08 must be issued by the application program and then the response should be read to check the status. If the response status is OK, then the key can be read from the same file "keycard01.txt". The read Key process of the memory device comprises the following steps:

Step 431: Starting the process to Read Key.

Step 432: The application program executed in the external device writes command (index 0x08) to the file "keycard.txt" of the memory device.

Step 433: The application program reads responses from the file "keycard01.txt" of the memory device.

Step 434: The application program checks the content of file "keycard01.txt" to see if the response format and status thereof are valid.

If the result of check performed in Step 434 is "OK", then proceeds Step 435 to read Key from the file "keycard01.txt" and then proceeds Step 436; if the result of check performed in Step 434 is "Error", then proceeds Step 436 directly.

Step 436: End process.

Please refer to FIG. 16, which illustrates a flow chart about how to write the Key into the memory device according to the embodiment of the present invention. After initialized the memory device, the key can be written to the memory device at any time. In order to write the key, the write key CMD with index 0x0B must be issued by the application program and then the response should be read to check the status. If the response status is OK, then the key will be written into the same file "keycard.txt". The write Key process of the memory device comprises the following steps:

Step 441: Starting the process to write Key.

Step 442: The application program executed in the external device writes command (index 0x0B) to the file "keycard.txt" of the memory device.

Step 443: The application program reads responses from the file "keycard01.txt" of the memory device.

Step 444: The application program checks the content of file "keycard01.txt" to see if the response format and status thereof are valid.

If the result of check performed in Step 444 is "OK", then proceeds Step 445 to write Key into the file "keycard.txt" and then proceeds Step 446; if the result of check performed in Step 444 is "Error", then proceeds Step 446 directly.

Step 446: End process.

It should be noted that the above described embodiments are not to be construed as limiting the applicable scope of the invention, but instead the protective scope of the invention should be defined by the technical spirit of the appended claims along with their full scope of equivalents. In other words, equivalents and modifications made based on the appended claims still accords with the intention of the invention and dose not depart from the spirit and scope of the invention. Thus, all should be regarded as further implementations of the invention.

What is claimed is:

1. A method for soft configuring a memory device, comprising:

Step (A): connecting the memory device to an external device having an application program;

Step (B): running said application program on the external device, said application program generating at least a command and then writing and storing a specific data into the memory device, wherein said specific data is generated by the application program run on the external device and is written in a written file saved in the memory device and including at least said command and a key; wherein said specific data contained in the written file is a variable which depends upon the command being generated by the application program run on the external device;

Step (C): the memory device generating a response value according to the command and the key of the specific data, said response value being contained in a response file which is saved in the memory device; wherein said response value is a variable depending on the content of the specific data contained in the written file; wherein said memory device does not send the response value to the external device; and wherein said response value generated by said memory device is valid only if both said command and said key are valid; and Step (D): the external device reading the response file from the memory device in order to obtain the response value contained in the response file, and then the external device checking a status of the response value; if the response value is checked to be valid, then the application program of the external device will be able to access the memory device by using functions defined by the command which has been generated by the application program and written in the written file during the Step (B); if the response value is checked to be invalid, then functions of the application program will be restricted.

2. The method of claim 1, wherein the key is a cipher key used to scramble the data stored in the memory device.

3. The method of claim 1, wherein the command is used to determine the function executable by the application program, and the key is used to check an authority status of the application program.

4. The method of claim 3, wherein when the command refers to disable a READ function, then only filenames of data stored in the memory device can be read by the application program, but the content of those data cannot be read;

wherein when the command refers to disable a WRITE function, then no data can be written to the memory device by the application program.

5. The method of claim 1, wherein said memory device is capable of communication by using at least a first protocol and a second protocol, said command contained in specific data refers to a detecting sequence of communication protocols of the memory device, the specific data will set up a preferred prior order of protocols when the memory device is switched to use one of the protocols corresponding to a supported protocol of the external device.

* * * * *